(12) United States Patent
Lerner

(10) Patent No.: US 12,291,128 B1
(45) Date of Patent: May 6, 2025

(54) TRUCK WITH MOVEABLY MOUNTED SOLAR PANELS

(71) Applicant: William S. Lerner, Litchfield, CT (US)

(72) Inventor: William S. Lerner, Litchfield, CT (US)

( * ) Notice: Subject to any disclaimer, the term of this patent is extended or adjusted under 35 U.S.C. 154(b) by 267 days.

(21) Appl. No.: 17/853,223

(22) Filed: Jun. 29, 2022

Related U.S. Application Data

(60) Provisional application No. 63/217,685, filed on Jul. 1, 2021.

(51) Int. Cl.
*B60L 8/00* (2006.01)
*B60L 53/51* (2019.01)
*H02S 20/32* (2014.01)

(52) U.S. Cl.
CPC .............. *B60L 8/003* (2013.01); *B60L 53/51* (2019.02); *H02S 20/32* (2014.12)

(58) Field of Classification Search
CPC ........... H02S 20/32; B60L 8/003; B60L 53/51
See application file for complete search history.

(56) References Cited

U.S. PATENT DOCUMENTS

| | | | |
|---|---|---|---|
| 6,331,031 B1 * | 12/2001 | Patz | H01L 31/048 296/214 |
| 6,423,894 B1 * | 7/2002 | Patz | B60J 7/00 180/2.2 |
| 8,413,671 B2 * | 4/2013 | Li | A45B 23/00 135/96 |
| 10,439,549 B2 * | 10/2019 | Kurlagunda | H02S 20/30 |
| 11,584,207 B2 * | 2/2023 | Williams | B60L 8/003 |
| 11,923,801 B2 * | 3/2024 | Prentice | H02S 10/40 |
| 11,999,266 B1 * | 6/2024 | Singer | H02S 20/30 |
| 2009/0288891 A1 | 11/2009 | Budge | |
| 2011/0023864 A1 | 2/2011 | Andretich | |
| 2024/0181861 A1 * | 6/2024 | Perlo | H02S 50/00 |

FOREIGN PATENT DOCUMENTS

| | | |
|---|---|---|
| CN | 201254072 | 7/2008 |
| CN | 201264534 | 8/2008 |
| CN | 201309708 | 9/2009 |
| CN | 201901009 U | 7/2011 |
| CN | 102666161 A | 9/2012 |
| CN | 205311786 U | 6/2016 |
| CN | 206809587 | 12/2017 |
| CN | 112271982 A | 1/2021 |
| EP | 2762348 A2 | 8/2014 |
| JP | 3188002 U | 10/2010 |
| WO | 2011046198 A1 | 4/2011 |

(Continued)

OTHER PUBLICATIONS

CN102666161A—machine translation.

(Continued)

*Primary Examiner* — Bryan A Evans
(74) *Attorney, Agent, or Firm* — Appleton Luff

(57) ABSTRACT

A truck includes a container with an upper portion with a plurality of photovoltaic panels mounted upon an exterior surface of the upper portion. The photovoltaic panels are mounted to permit movement from a closed position to one or more open positions. A battery is electrically coupled to the one or more photovoltaic panels to store electrical energy generated by the one or more photovoltaic panels.

20 Claims, 16 Drawing Sheets

(56) References Cited

FOREIGN PATENT DOCUMENTS

WO    2011046206  A1    4/2011
WO    2019227884  A1    12/2019

OTHER PUBLICATIONS

CN112271982A—machine translation.
CN201254072Y—machine translation.
CN201264534Y—machine translation.
CN201309708Y—machine translation.
CN201901009U—machine translation.
CN205311786U—machine translation.
CN206809587—machine translation.
JP3188002U—machine translation.
WO2011046198—machine translation.
WO2011046206—machine translation.

* cited by examiner

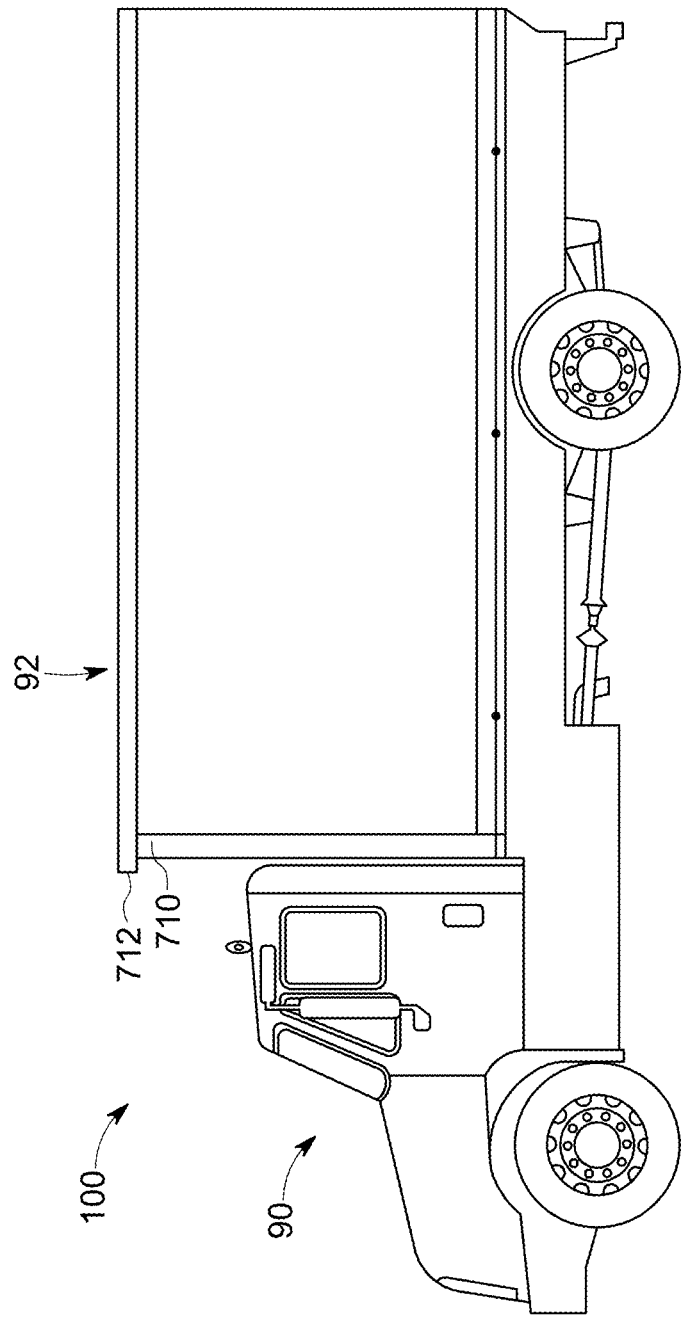

TRUCK WITH MOVEABLY MOUNTED SOLAR PANELS

RELATED APPLICATIONS

This application claims priority to U.S. provisional patent application 63/217,685 filed on Jul. 1, 2021, which application is hereby incorporated by reference in its entirety.

FIELD OF THE DISCLOSURE

This disclosure relates generally generation of electrical power from solar energy and more particularly to such power generation in connection with vehicles.

BACKGROUND

Trucks are widely used to transport cargo, typically between warehouses, factories, wholesalers, and retailers. Such vehicles, commonly known as freight trucks, by virtue of their size and weight, can consume large amounts of energy. Conventionally, freight trucks use carbon-based fuels (e.g., gasoline, diesel, jet fuel), the use of which is known to produce harmful emissions such as particulate matter, hydrocarbons, and other pollutants such as nitrous oxide and sulfur dioxide. A similar problem exists with other types of trucks. An example is a food truck, which parks in one place to sell breakfast, lunch and dinner, event food trucks, state fair type trucks, which constantly travel and are always outdoors, campers, RVs, "Ice Cream Trucks", trucks at craft fairs, and food vendor carts, such as the type found in New York City. While use of renewable energy to power such vehicles has been suggested there remains a need to increase the efficiency and reduce the carbon footprint of such vehicles.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques.

FIG. 11A, FIG. 11B and FIG. 11C show left-side, front and rear views, respectively of an embodiment of a truck with all installed solar panels retracted.

DETAILED DESCRIPTION

Figure 1:
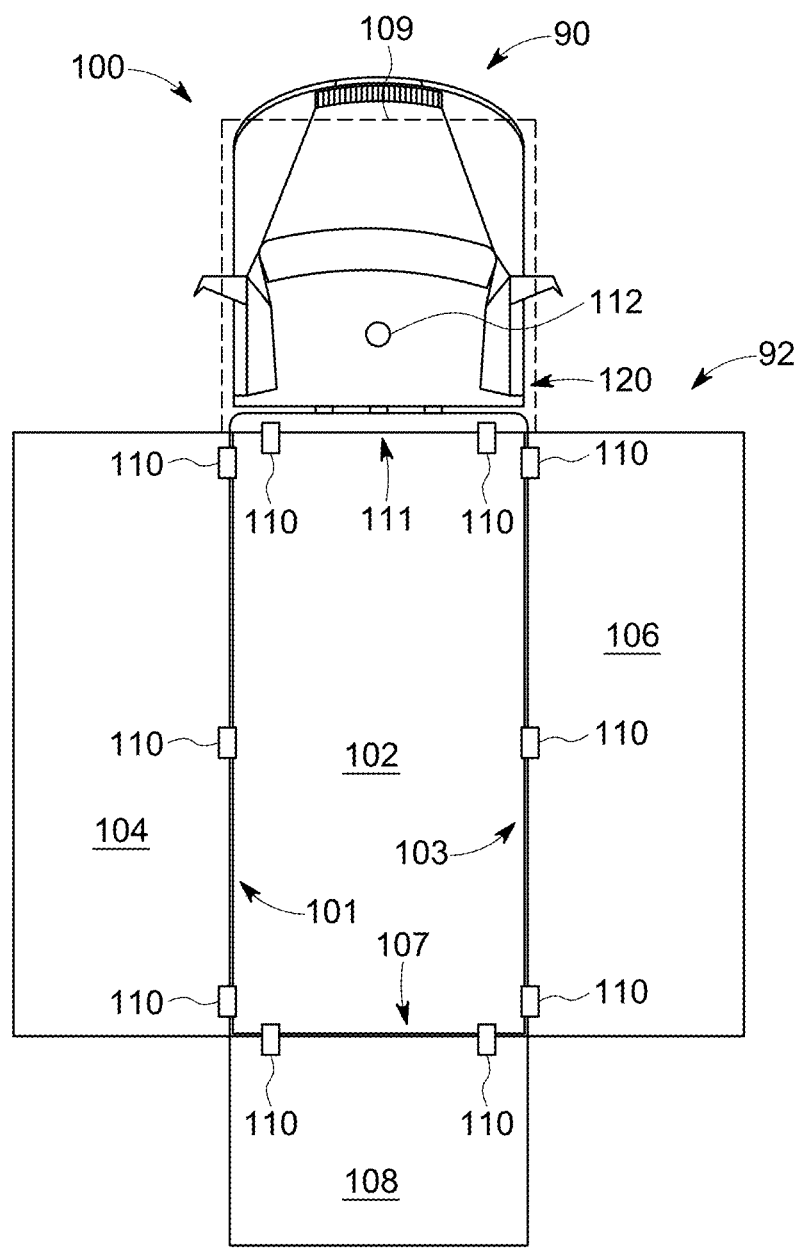
FIG. 1 shows a top view of a truck with solar panels attached in accordance with an embodiment.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

Various embodiments are disclosed herein where a truck has a container with an upper portion. The upper portion of the container has one or more photovoltaic panels mounted upon an exterior surface of the upper portion. One or more of the photovoltaic panels are mounted to permit movement from a closed position to one or more open positions. The truck also has at least one battery electrically coupled to the one or more photovoltaic panels to store electrical energy generated by the one or more photovoltaic panels.

The photovoltaic panels can potentially produce and store enough energy to power various accessories such as, for example, a cooking surface, a refrigerator, an air conditioner, a freezer, or an oven. Small food carts, that appear on the streets of New York City are limited to ten feet long by five feet wide. Most are smaller. They are one of the most harmful of all polluting equipment at the consumer or child's breathing level. More than sixty percent of the roughly eight thousand carts, use gasoline or diesel generators for power. They continually run, emitting non-filtered fumes at a child's height and fill the streets with dangerous pollutants. One or more of the embodiments disclosed herein can reduce the carbon footprint of such carts.

In the following description, a box truck is shown and described. A box truck is also sometimes referred to as a box van, cube van, bob truck or cube truck. Such terms refer to a chassis cab truck with an enclosed cuboid-shaped cargo area. On most box trucks, the cabin is separate to the cargo area. Some box trucks may have a door between the cabin and the cargo area. A chassis cab truck employs a chassis cab, also sometimes referred to as a cab chassis or half truck. This refers to a type of vehicle construction, often found in medium duty truck commercial vehicles. Often, a chassis cab truck is provided with chassis rails and a cab to which a flatbed or cargo container or other equipment is attached. This permits a chassis cab truck to take a variety of forms including an ambulance, a recreational vehicle, a delivery truck, fire engine, etc.

Box trucks are typically 10-26 ft (3.0-7.9 m) in length and can range from Class 3 to Class 7 (12,500 lb. to 33,000 lb. gross vehicle weight rating). They often have a garage door-like rear door that rolls up, or large double doors. Many of these trucks have electric controls for a drop down, loading platform, that meets the ground, and uses the same motor to retract the loading deck. Some box trucks may employ a Luton body where an enclosed box mounted to the chassis extends over the cab. The portion of the box that rests over the cab is sometimes referred to as the peak, a Luton, or a kick. Some commercial vehicles have tilting cabs. To allow for this the floor of the Luton may be hinged, and there may be a hinged flap at the front.

A van can also be used to transport goods. Generally, the term "van" refers to a unibody type construction where the chassis and body form a single piece, i.e., a unibody, as opposed to a chassis cab to which a cargo box is attached.

The disclosed embodiments may be better understood by way of the accompanying figures which are described below.

FIG. 1 shows a top view of an embodiment in which a roof of a truck 100 is shown. The truck includes a cab seen generally at 90 and a box seen generally at 92. The top of the box portion 90 (i.e., the outer facing surface of the roof panel) has one or more solar panels (also sometimes referred to as photovoltaic panels) positioned thereupon. The panels may be monocrystalline, polycrystalline, multi-crystalline, thin film, biohybrid solar cells, amorphous silicon solar cells, or other types in use or in development for future use. In the embodiment of FIG. 1, the roof panel 102 will always be partially visible as a solar panel regardless of the folding positions or patterns described. Alternatively, even if all folding panels were removed, for example: "panel sharing", there will always be one flat panel of the roof that stays with the vehicle. This ensures that no matter what position the folding panels may take when parked the truck is always using its solar resources. Other solar panels, such as left-side panel 104, right-side panel 106, rear panel 108, front panel 109 may rotate out for maximum exposure. The panels 104, 106, 108, 109 may rotate out in a butterfly effect, one panel may rotate out, both panels may rotate out to the sides of the truck 100, etc. The side or long side panels 104, 106 can operate independently or as a pair and assume any position from vertical to horizontal. The position will match the maximum available light exposure, while keeping a safe distance from objects in the vicinity. The solar panels are moveably attached to the truck 100 by way of one or more hinges, shown generally at 110, which are typically motorized to permit the panels 104, 106, 108, 109 to rotate about a corresponding upper edge of the box portion of the truck 100. Left-side panel 104 rotates about left-side edge seen generally at 101. Right-side panel 106 rotates about right side edge seen generally at 103. Rear panel 108 rotates about rear edge 107 and front panel 109 rotates about front edge 111.

In FIG. 1, the panels 104, 106, 108, 109 are shown in an extended position which can be employed while the truck 100 is stationary. While the truck 100 is in motion the solar panels 104, 106, 108, 109 will be in a closed or retracted position where the left-side panel 104 is positioned so as to be substantially parallel to the left side of the box 92. In the closed position, the right-side panel 106 is positioned so as to be substantially parallel to the right side of the box 92, and the rear panel 108 is positioned so as to be substantially parallel to the rear of the box 92. In the closed position the front panel 109 will be positioned to lie flat on top of roof panel 102. In certain embodiments, front panel 109 may have solar cells on both sides so as to generate electrical energy while in the open and closed positions. The other panels 104, 106, 108 may also have solar cells on both sides but this may not be cost effective as the side of the panel that faces toward the corresponding surface of the box 92 will rarely be exposed to sufficient light to generate meaningful energy.

The solar panels shown in the drawings and described herein supply their generated electrical energy via conventional hardware for storage in a conventional battery system, seen generally at 120, which will typically be comprised of one or more batteries (e.g., lithium-ion, lead acid or other type). The battery system 120 may be configured to supply electrical energy to one or more systems on or separate from the truck 100 including providing power for electric motors to cause movement of the truck 100 and/or for various auxiliary functions.

At 112 is shown a sensor that may be part of the system to monitor the surrounding area and adjust the panels for clearance to other vehicles or obstacles. Sensor 112 may be a proximity sensor, which operates to measure a distance(s). If a truck or other object violates the desired space an alarm, alert, warning light, acoustical alert or any other type of information gathering and transmitting means is triggered. This proximity sensor 112 can be used alone or in conjunction with a camera. For example, the proximity sensor may set off an alert and send a live view to the truck operator, the central station, to a smart phone, smart watch, tablet, computer screen, laptop etc. Additionally, the proximity sensor may only be transmitted as an image, meaning it would automatically open a display on a user's surface and show the current activity. The activity can be stored and retrieved for later viewing. The sensor may also have a built-in warning light, like a flashing brake light, if another truck breaches the pre-determined boundary area. The sensor may also be incorporated with two-way communication, meaning if an object has breached the pre-determined zone, a two-way conversation can occur. This conversation between the owner of the truck and the truck or other object in the area, can help facilitate parking positions which would be beneficial for both parties, looking for maximum solar capture for example. The sensor may be hard wired into the truck or may be movable. For example, movable sensors alerts, lights, two-way communications) can be battery powered. The advantages are that they can be placed by the user in the optimal location, or locations. Since trucks, heavy and light duty vehicles, food carts, etc., have long service lives (trucks can be continuously in service for decades, for example: a semi truck's lifespan can typically be 15 to 16 years, and be in use for up to 750,000 miles or more) the wireless sensors are ideal for retrofitting an older truck or commercial vehicle. The sensors are reasonably inexpensive, which allows the user to constantly upgrade the system. The user may have six for example, which may have sensors on all four corners of the vehicle, and two in the middle of the long part of the truck. If the truck is going to be parked next to a wall on one side, the battery powered sensors may be removed from a clip-on attachment or magnet type attachment. This saves wear and tear from exposure, and the batteries may be removed from the sensor to conserve power and constant communications. Alternatively, the "battery powered sensors" can be rechargeable type batteries, that need to be connected to a re-charging wire. Theft and vandalism can be an issue in truck storage areas, so the removable sensors provide an additional benefit. The sensors may be part of a system for a truck, that is in service.

Meaning, if a truck is taken out of service for repair or storage, the wireless sensor(s) may easily be moved to another truck or vehicle.

Additionally, a system as described herein in conjunction with the described sensors may have an additional function. Such a system can use a different pre-programmed zone, to alert the operator if the opening of the panels would hit an obstruction. Meaning, an operator may gauge a ceiling height incorrectly, and by doing so, could open the solar panel in a way that would cause damage to it. In another example, an operator may not see a low hanging tree branch, that could damage the panel as it is moved. Having sensors and associated processing as described herein with multiple zone configurations and cameras, can allow maximum solar harnessing at the site of the truck or vehicle or remotely from any location. As described this can be pre-programmed, for example, if the truck's routine is the same on a daily basis, for example. The sensors may also sense temperature, rain, snow, sleet, debris etc. That alert can be sent to the operator. One advantage for example is snow and temperature sensing. Snow can be heavy, and the operator may want to be alerted if an excess amount of snow (1-2 feet) could damage a panel, or motor. The sensor(s) can provide information that permits the system to be programmed to detect the direct path of the sun, meaning it can "follow the sun," for example by adjusting the solar panels to always be at an optimum angle to the received sunlight for maximum solar capture. Certain sensors can also monitor noise which can permit alert of a potential vandalism or theft of components, if detected late at night. The noise sensor can also alert damage to the truck, such as another truck backing into it, and potentially damaging the sensors, solar panels, controls and motors. The system under control of an operator may also be able to "silence" any sensor, meaning if the front of the truck for example is perpendicular to an active street. Meaning, the truck could be parked five feet from a busy intersection, in a driveway. The system may also have an "emergency" button which can be activated to instantly close all the open solar panels. This can be useful during an unexpected windstorm, hurricane type situation or snow squall/blizzard. The system may also be "trained" to respond to certain noises or frequencies or "sound signatures." These signatures can be sounds of panels straining, motors failing, panels being unbolted (theft), etc. The sensor's camera may be remotely activated to monitor the area, meaning if the operator wants to raise the solar panels on the right side of the truck, but at the time the truck was parked, there was a truck in that space which did not allow that sides panel to be raised. The operator could at any time, activate the camera(s) on the sensor to see if the truck has moved, leaving a space that allows the panel to be opened.

Certain sensors may incorporate four cameras for example. One forward facing, one right side facing, one left side facing and one upwards facing. The sensor can sit on the top surface of the truck's bumper, hood, roof, etc., so it will not be damaged if for example another truck backed into the operator's truck. The cameras may take the form of rear or panorama wide view cameras. The locations shown and described are just examples. The cameras can be mounted on the sides, back, front, or anywhere the component or automobile maker decides. If there are two on the side, one in the front, and one at the rear, it can give the "top view" of the vehicle, which pieces all four images from the camera to make it a bird's eye view, and the image can be manipulated and rotated. Advantages include the ability to see where the off gassing or venting is occurring from the vehicle. Meaning are flames or toxic gasses coming from under the driver's door or the rear of the vehicle. This is important, because there are no standards as to how vehicles vent. Additionally, hydrogen vents from the rear of the vehicle downward, which is not ideal, since hydrogen rises quickly. Venting from the rear, could create a fireball which is propelled backwards. Having the top view availability allows a first responder to see if there is a hydrogen fire, or if the hydrogen venting, initiated a fire to a combustible nearby.

If the cameras are on all sides, they can augment a surround view system built into the vehicle, if the system is not functioning, or the vehicle is not equipped with a surround view system. Many vehicles only have rear "back up" cameras. Older vehicles can also be retrofitted, and be made to be state of the art, for the first responder's needs. Additionally, the wiring, controllers or cameras of the vehicle may fail to function in a fire or off gassing situation where excess heat or fire may occur on or underneath the vehicle. Additionally, if the vehicle has been in a front to rear accident, the front camera may not function, however using the backup cameras provided on the shark's fin, the availability of the top view will still be available. Accidents also involve damage to exterior rear-view mirrors, which house the cameras. In severe frontal or "small overlap" collisions (in excess of 35 MPH for example) the front of the vehicle and hood, would sustain excessive damage. Modern vehicles are built to crumple and absorb impacts, so they do not compromise the reinforced passenger areas. These designs put the safety of the occupants as the first priority, which in turn makes the components under the hood from the firewall to the grille more vulnerable. Changing the vehicle's architecture to ensure occupant safety clearly points out the need for a secondary or fail-safe system. A sharks fin location which is typically on the rear portion and in the center of the roof is perhaps the least likely area to be damaged. Currently only 3% of vehicle crashes involve rollovers. Since the sharks fin system is self-contained, and can include a backup battery system, it offers the most comprehensive back up system in the least venerable area of the vehicle.

Figure 2:
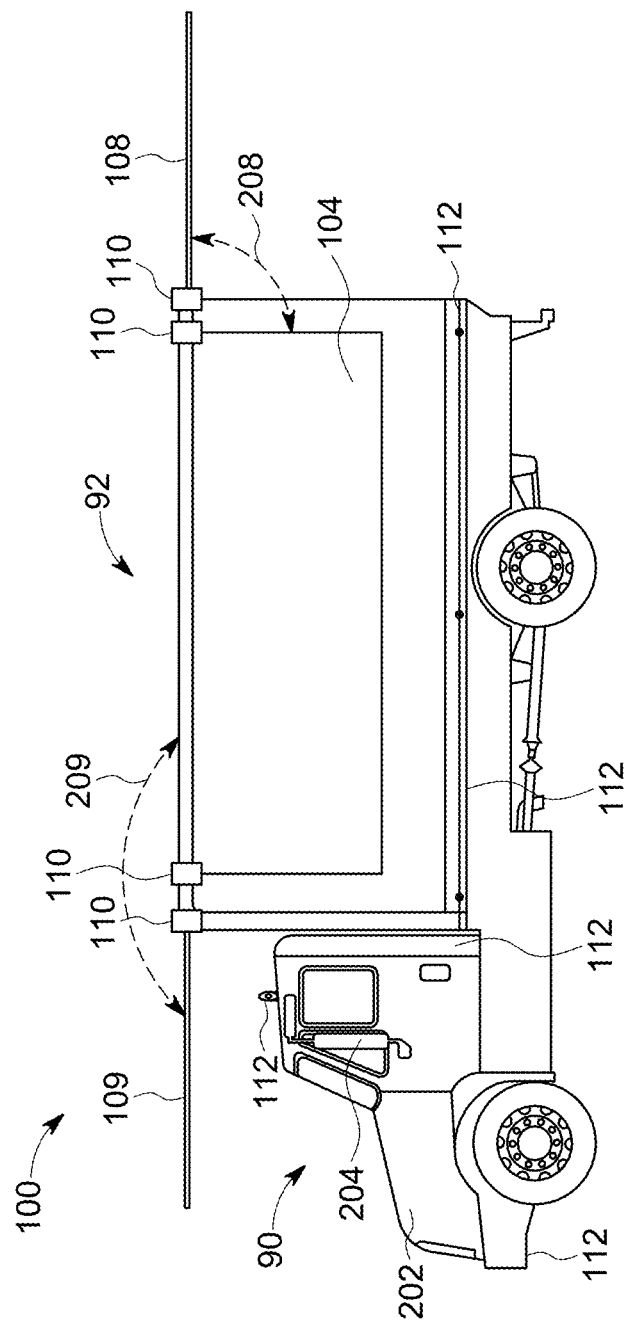
FIG. 2 shows a left side view of the truck shown in FIG. 1.

FIG. 2 shows a left side view of truck 100 with solar panels attached in accordance with an embodiment. In FIG. 2, solar panels 104, 108 and 109 are shown along with their corresponding hinges 110. Panel 104 is shown in a closed position and panels 108 and 109 are shown in an open position. Panel 108 is positioned at an angle 208 which is approximately 90 degrees with respect to the rear of the box 92. Panel 109 is positioned at an angle 209 which is approximately 180 degrees with respect to the top of the box 92. Also shown are multiple sensors 112 attached at various positions on the truck 100 including the roof of the cab, the front bumper, adjacent to the driver side door, on the truck frame and on the rear bumper. The truck 100 also has an on-board controller 202 that may be mounted in the cab and an in-cabin display 204 to provide a visual interface to control and providing information on the positioning and movement of the various solar panels. The sensors 112 which may take the form of a distance or object sensor, may or may not include an indicator such as a light or sound component. Any device known in the art which may include a traditional "beep, beep, beep" like a truck backing up sound which could warn others in the area the solar panels are folding up or being folded in. Alternatively, light, and sound components may be in one two or three separate units as the manufacturer sees fit. Sensors may be located anywhere on the vehicle and may be on the external mirrors or embedded in the headlights, brake lights or turn signals. One or more batteries (not shown) are electrically coupled by way of inverters and/or power conditioners (not shown) to the one or more photovoltaic panels to store electrical energy generated by the one or more photovoltaic panels.

In one embodiment, the front panel 109 that covers the front of the cab can slide out from underneath the fixed roof panel 102 above the container part of the truck. The side panels, such as panel 104 and rear panel 108 may similarly slide out. The advantage here is that it does not need the height to increase the solar area. The front panel 109 can be programmed to automatically extend each time the door is locked. It can also be programmed to extend out only during the day, if the solar sensor detects it is daytime. This will save wear and tear on the motors and keep the panel clean and unexposed if there is no energy to capture. The side panels such as panel 104 may operate similarly. Additionally, there can be a series of pre-programmed programs. So, for example, program #1 operates to cause the front solar panel 109 to slide out. Program #2 operates to cause the front panel 109 and side panels 104 and 106 to slide out. As can also be seen in FIG. 2, the rear panel 108 provides shade over the rear door and protection from rain, snow, sleet, etc.

Figure 3:
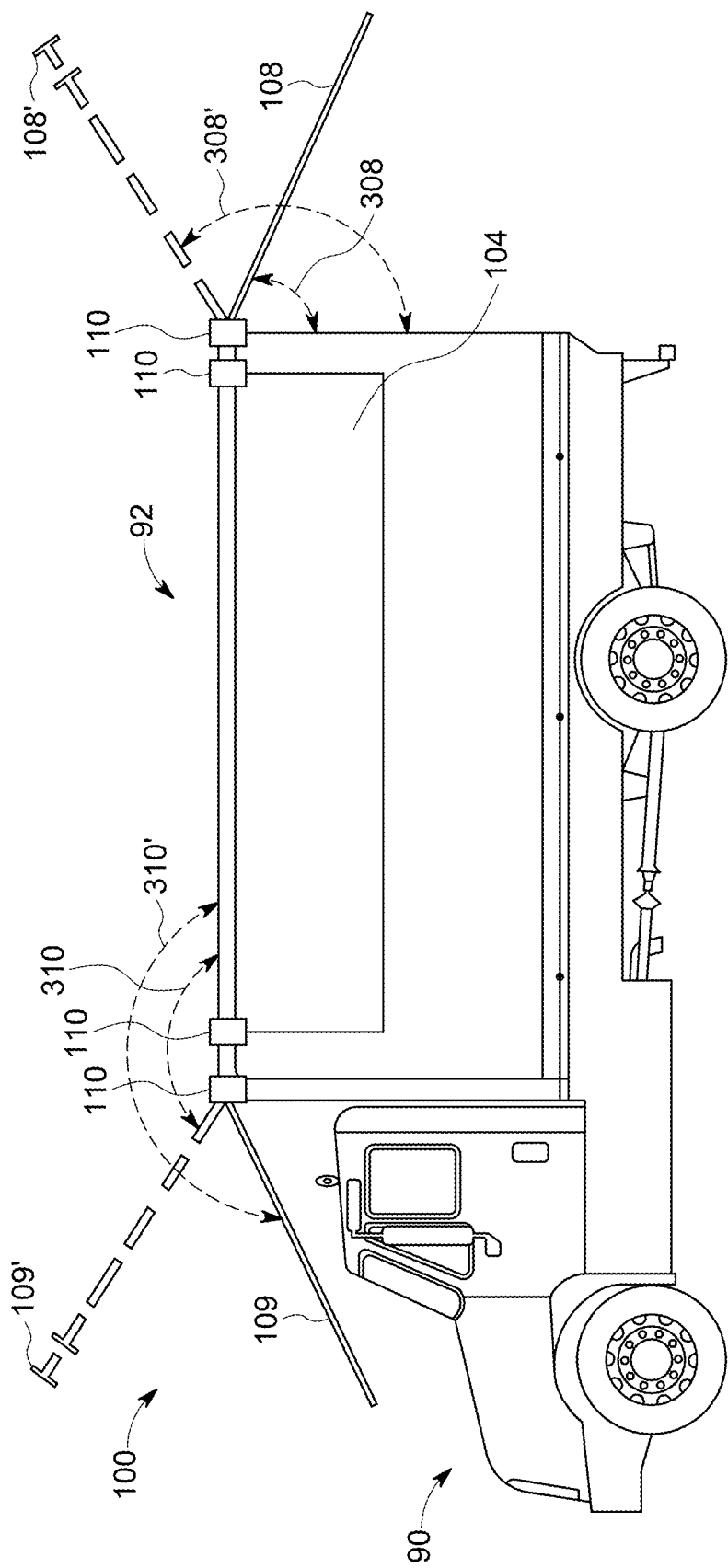
FIG. 3 shows a left side view of the truck shown in FIG. 1 with front and rear panels in different positions.

FIG. 3 shows a left side view of truck 100 with the rear and front panels 108, 109 in different positions. As seen, rear panel 108 is shown in a first position (108) at a downward slant at an angle 308 measured with respect to the rear of the box 92 and the rear panel 108. The panel 108 is also shown at a second position 108' at an upward slant at an angle 308' which is also measured with respect to the rear of the box 92 and the rear panel 108, in other words from the position where the panel 108 is in a closed position. Front panel 109 is shown in a first position (109) at a downward slant at an angle 310 measured with respect to the top of the box 92 and the front panel 109 (the closed position). The panel 109 is also shown at a second position 109' at an upward slant at an angle 309' which is also measured from the closed position. In FIG. 3, panel 104 is shown in a closed position. As explained elsewhere herein, the solar panels may be adjusted to various positions for various reasons including optimizing power generation based on the angle of the sunlight impacting a particular panel, or also to avoid various surrounding obstacles such as trees, other vehicles, buildings, etc.

Figure 4:
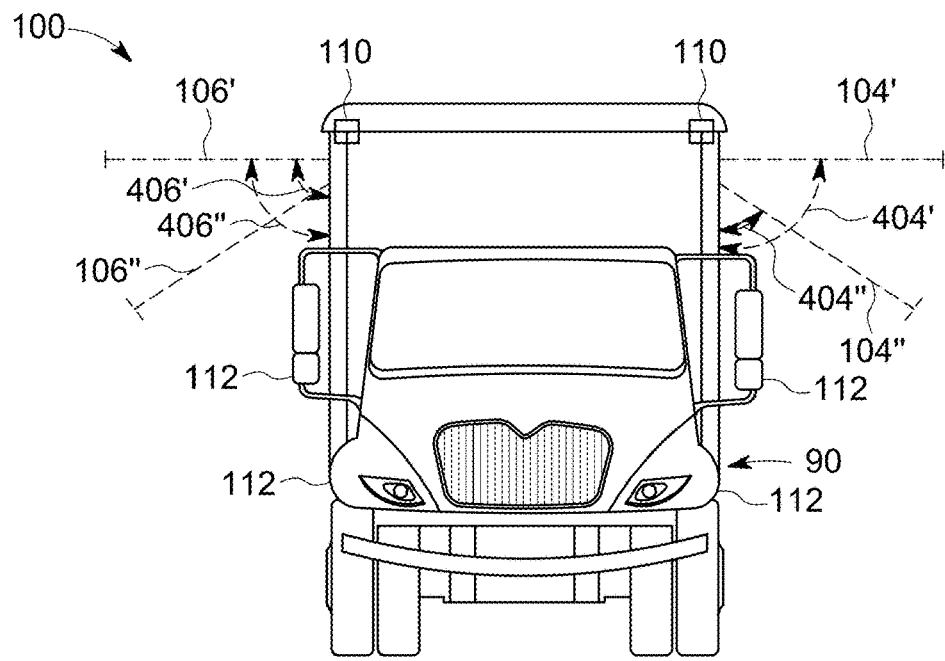
FIG. 4 shows a front view of the truck shown in FIG. 1 with left and right side panels in different positions.

FIG. 4 shows by way of a front view of truck 100 to better illustrate movement of left-side and right-side panels 104 and 106. Left-side panel 104 is shown in two different positions, 104' and 104" corresponding to angles 404' and 404". Right-side panel is shown at two positions, 106' and 106" corresponding to angles 406' and 406". Positions 104' and 106' have the left-side and right-side panels, respectively, positioned at a substantially horizontal position at approximately 90 degrees from the corresponding side of the box 92. Positions 104" and 106" have the left-side and right-side panels, respectively, positioned at a downward facing angle. These positions are merely examples and the positions of the left-side and right-side panels need not be symmetrical. For example, if the left-side panel is positioned at a downward facing angle then it may be more beneficial to position the right-side panel at an upward facing angle.

Figure 5:
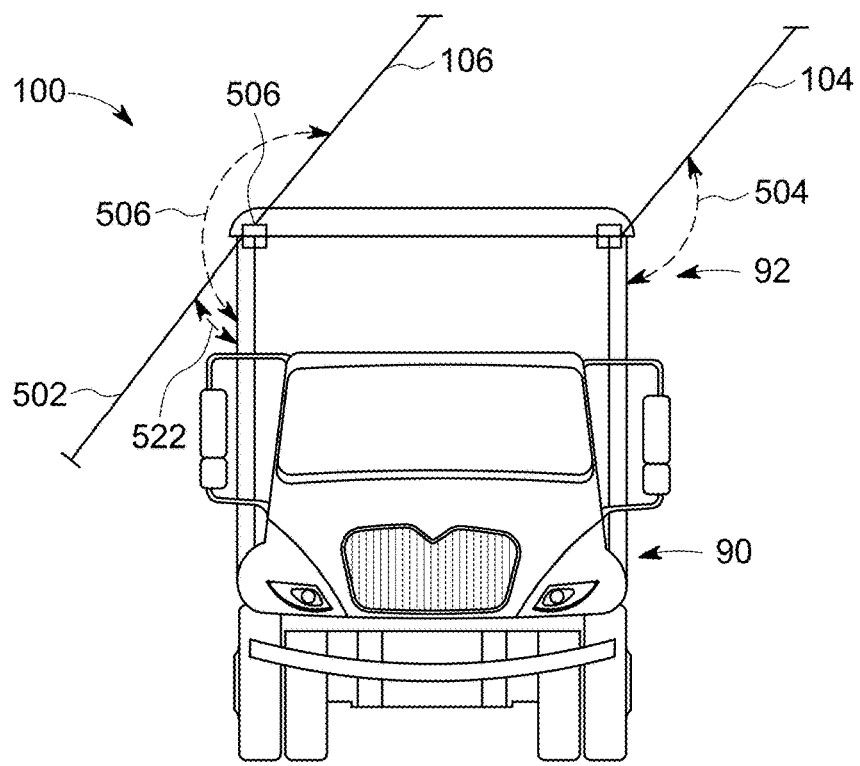
FIG. 5 shows an alternate embodiment of truck 100 that includes an additional side panel.

FIG. 5 shows an alternate embodiment of truck 100 that includes an additional side panel 502, in this case positioned on the right side of the vehicle. FIG. 4 shows a first ride side panel 106 that is positioned at an upward facing position corresponding to obtuse angle 506 and a second right-side panel 502 that is positioned at a downward facing position corresponding to acute angle 522. As seen, this addition of another side panel substantially increases, such as doubling, the photovoltaic surface area on the right side of the truck 100. In FIG. 5, left-side panel 104 is seen positioned at an upward facing position corresponding to obtuse angle 504.

Figure 6:
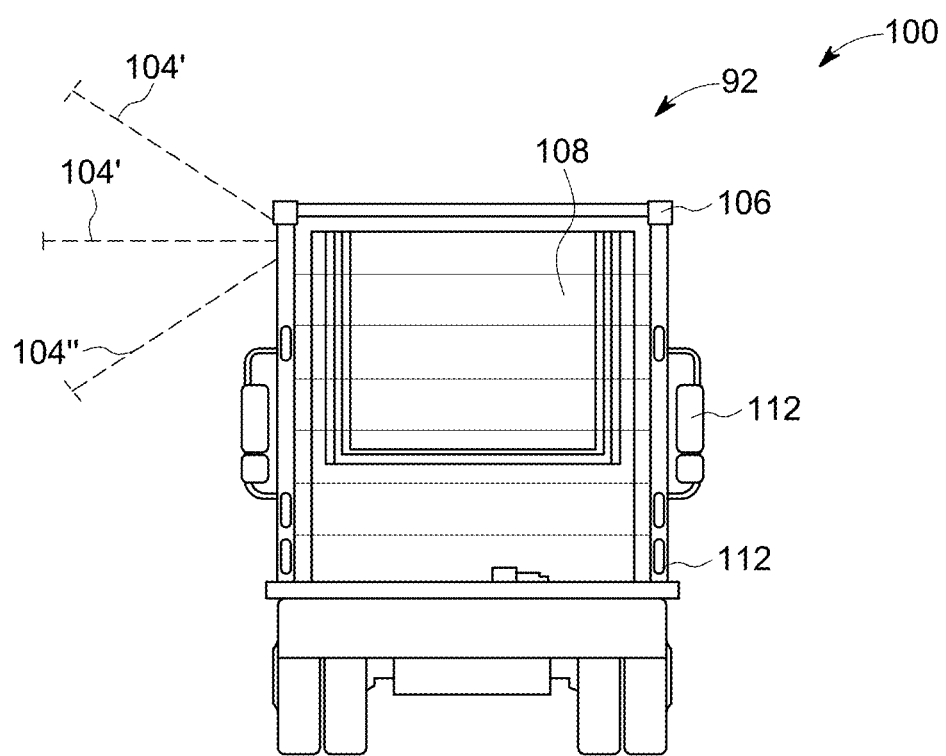
FIG. 6 shows a rear view of the truck shown in FIG. 1 with a rear panel in a downward facing position.

FIG. 6 shows a rear view of truck 100 with rear panel 108 in a closed, downward facing position that is substantially parallel to the rear surface of the truck 100. Also shown in FIG. 5 is left-side panel 104 in first, second and third positions (104, 104' and 104") and right-side panel 106 in a first position (106). Also shown in FIG. 6 are sensors 112 mounted to the rear-view mirror and rear bumper.

Figure 7A:
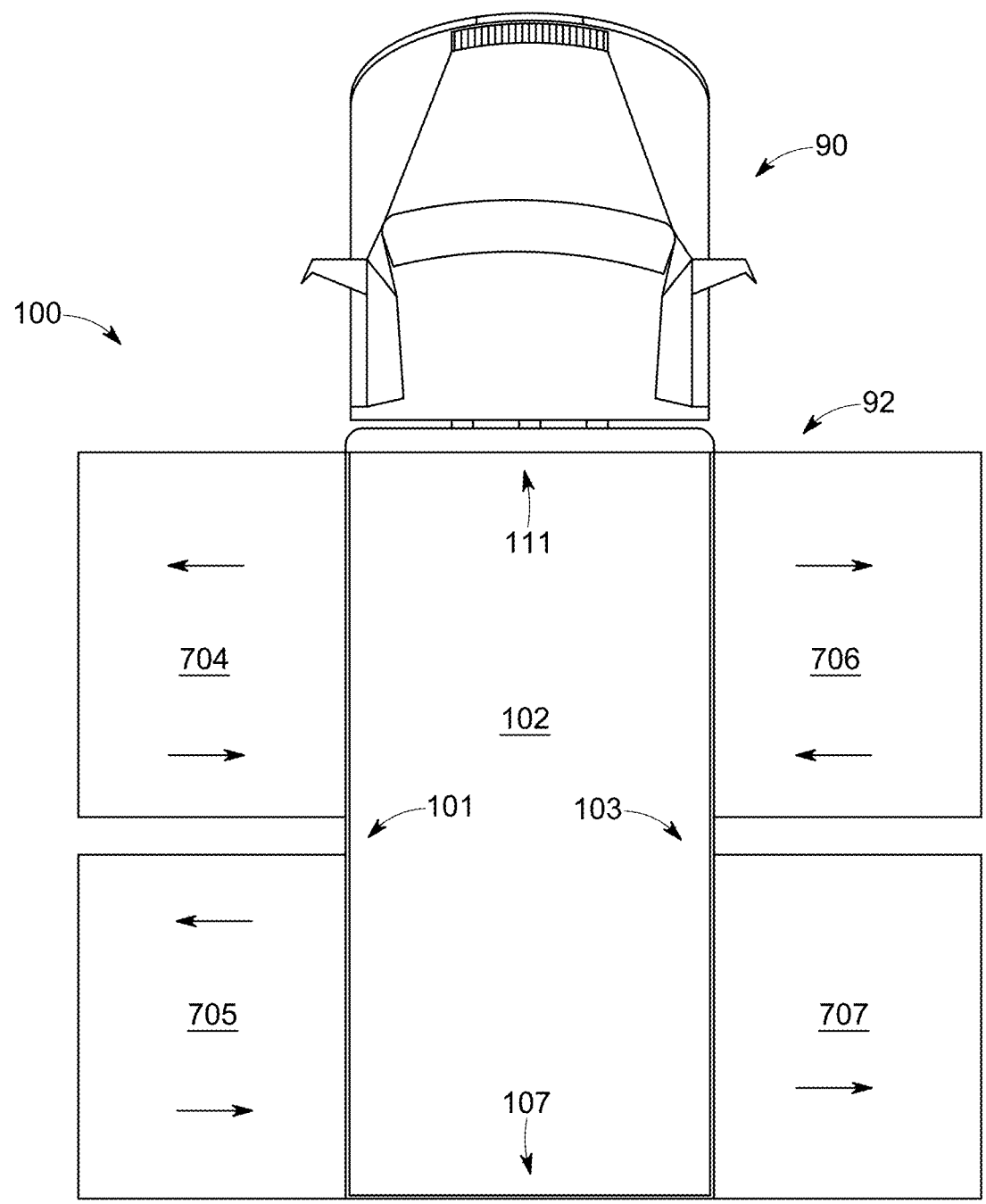
FIG. 7A is a top view of a truck showing another embodiment of mounting of left-side and right-side panels.
Figure 7B:
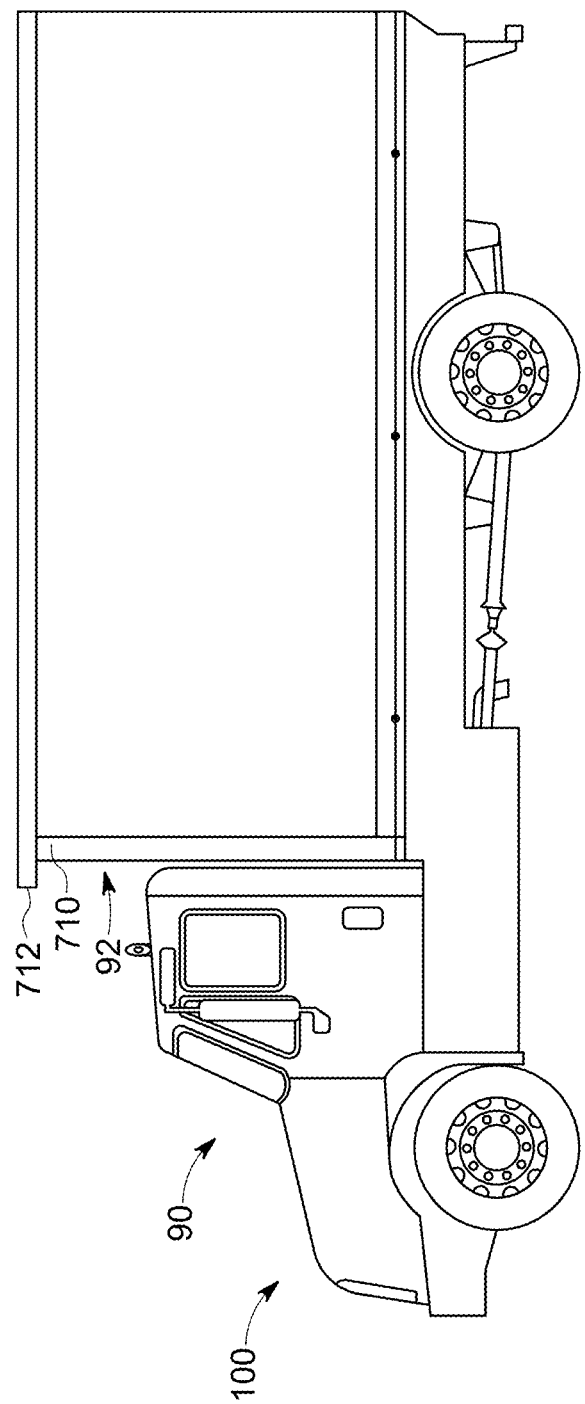
FIG. 7B is a left-side view of the truck shown in FIG. 7A.

FIG. 7A is a top view of truck 100 showing a second embodiment of mounting of left-side and right-side panels. In FIG. 7A the truck 100 has mounted thereupon first and second left-side panels 704 and 705 and first and second right-side panels 706 and 707 that extend on tracks (not shown) from a retracted position where the panel is positioned within the boundaries of the roof of the box 92 as defined by left and right-side edges 101 and 103 and rear and front edges 107 and 111 to an extended position as shown in FIG. 7A where the panels partially or wholly extend past a corresponding edge of the roof of the box 92. In one embodiment, the panels 704, 705, 706, 707 are positioned horizontally to be disposed below roof panel 102. This permits the tracks and motors (not shown) that cause movement of the panels 704, 705, 706, 707 to be located below roof panel 102 which improves appearance, aerodynamics and serves to protect the tracks and motors. The left and right side panels are split, so they can retract together or the one closest to the cab can be extended, while the one at the rear may be retracted. The four panels 704, 705, 706, 707 can operate independently to be fully extended, three panels may be extended, two or even one can be extended. Additionally, the panels may be extended or retracted to any position between fully retracted and fully extended. This configuration is useful where the truck 100 does not have the height to use the rotating panels shown in FIGS. 1 through 6. The advantages are if the truck is parked in a low-ceilinged garage, near a streetlight, or under a tree for example. The four panels operate independently but can be programmed in infinite combinations. Meaning if the truck is parked next to a wall on the right side, only the left panels may retract. This can be done manually, remotely, by sensors on the truck or panels, programmed to extend and retract, based on light sensors as previously described, timers, or any other means of communication, wired or wireless. The panels slide in and out on sturdy rails disposed to cause the panels 704 and 706 to be interleaved into a stacked arrangement when in a fully or partially closed position and similarly for panels 705 and 707. These panels fully retract and FIG. 7B shows at 710 and 712 two flaps which open downward and upward respectively to allow left-side panel(s) to extend to an open or partially open position. The flaps 710, 712 rotate to a closed position when the left-side panel(s) fully retract. The flaps 710, 712 serve two purposes: (i) to keep the mechanisms clean, and (ii) to aid in aerodynamics. The panels can be retracted to be completely flush, with a decorative panel covering all the mechanicals. The advantages of a sleek flush mounting, with a panel that makes the surface flush to the vehicle's side, eliminates the marring of the appearance of the side of the truck which is often advertising for the company. Additionally, a fleet owner may want all the trucks to look visually similar. Having a flush panel increases aerodynamics (lowers the drag coefficient) and provides uniformity to a fleet. It also looks cleaner, won't create lines in advertising or make "wrapping" the vehicle more difficult. And, if everything is flush, it is easier to keep the vehicle clean, and protects it from the elements.

As noted, front and rear panels may also slide out to an open position and into a retracted position in a manner similar to that described above in conjunction with FIG. 7A for the left and right side panels.

Figure 8:
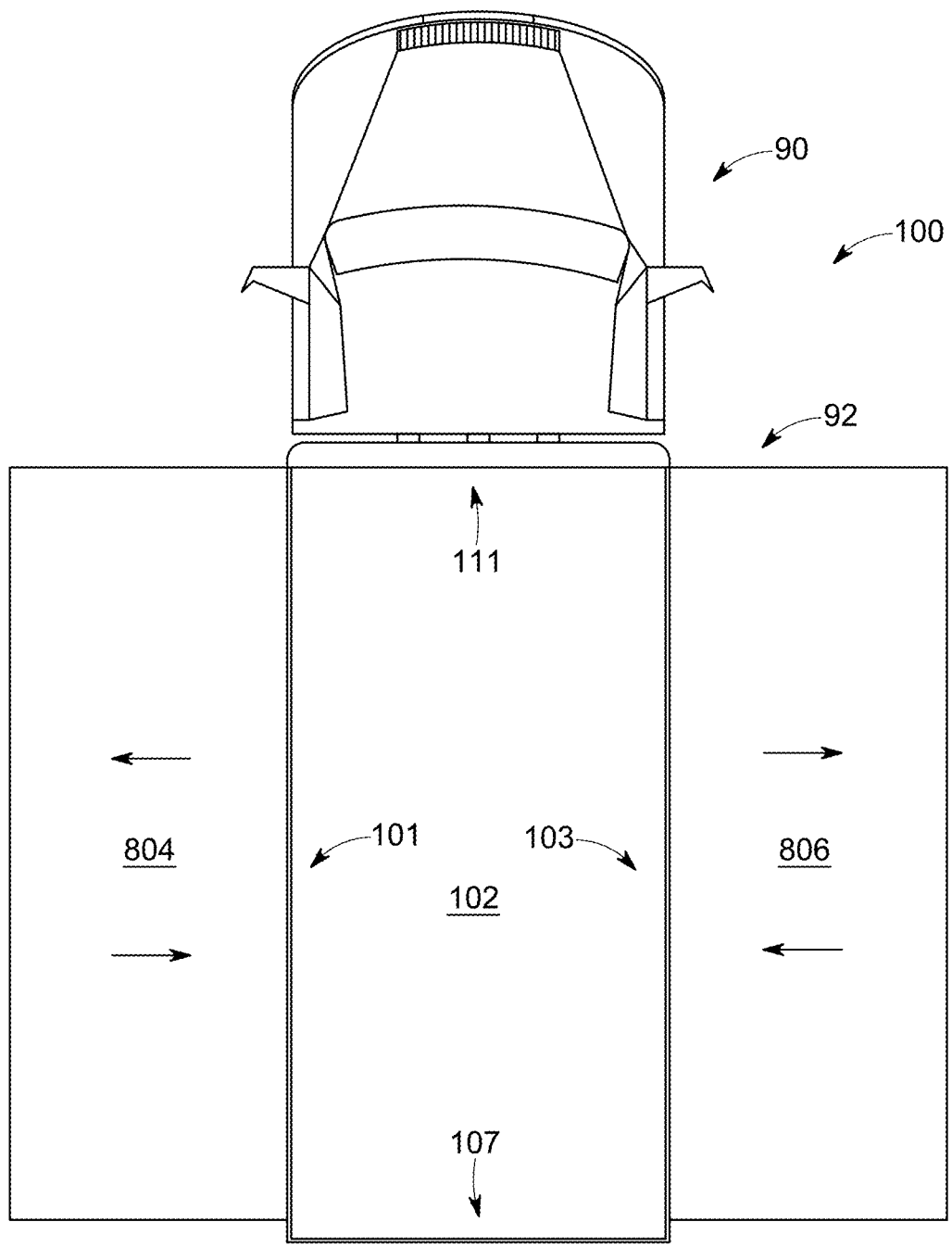
FIG. 8 is a top view of a truck showing another embodiment of mounting of left-side and right-side panels.

FIG. 8 shows another embodiment of mounting of left-side and right-side panels. In FIG. 8 the truck 100 has mounted thereupon a single left-side panel 804 and a single right-side panel 806 that each extend on tracks from a retracted position to an extended position. The panels 804 and 806 can retract together or extended individually. The two panels 804 and 806 can operate to be fully extended, or partially extended. As with the embodiment shown in FIGS. 6A and 6B the configuration of FIGS. 7A and 7B is useful where the truck 100 does not have the height to use the fold out panel shown in FIGS. 1-5. The operation and benefits are similar to those described above in connection with FIGS. 6A-6B but with less flexibility of deployment.

Figure 9:
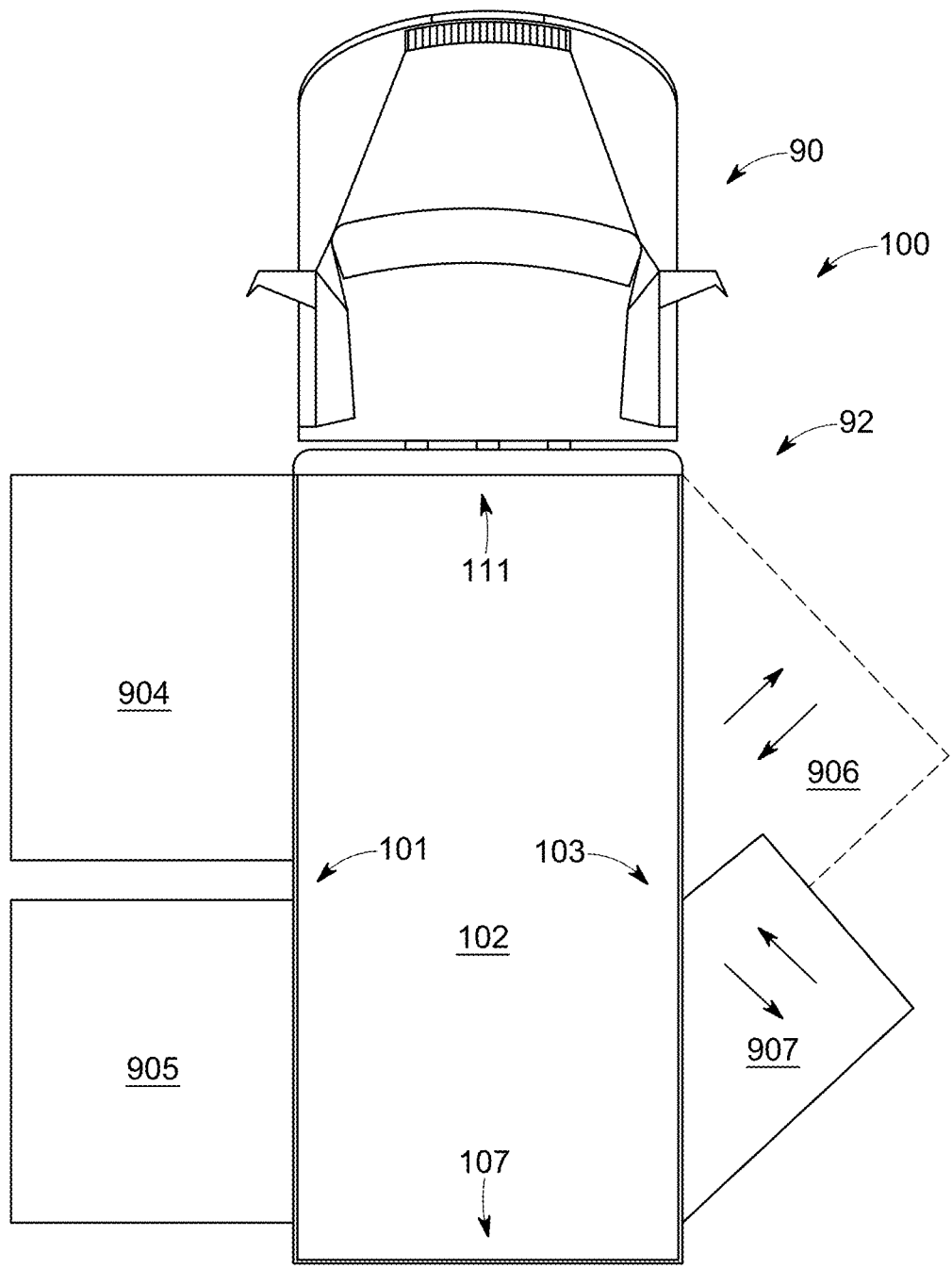
FIG. 9 is a top view of a truck showing another embodiment of mounting of left-side and right-side panels.

FIG. 9 shows another embodiment of mounting of left-side and right-side panels where the panels 904, 905 extend on rails similar to panels 704, 705 and panels 906 and 907 extend and retract like a bird's wings. In one embodiment they extend out to a position that optimizes the capture of solar energy and are repositioned as the angle of the light from the sun changes. This "origami" or wing like extension may be a particularly useful for the end user. A disadvantage over the direct extension panels of FIGS. 7A-B and FIG. 8 would be that this folding pattern requires more height. Where the embodiments of FIGS. 7A-B and FIG. 8 can be implemented with a two-level stacking, this intersection of any one roof mounted panel (904, 905, 906, 907) with potentially three other panels and hence adds some additional overall height to the truck 100.

The panels 904, 905, 906, 907 may be operated independently and/or in various combinations. The four panels can operate to be fully extended, three panels may be extended, two or even one can be extended. Additionally, the panels may be extended or retracted to any position between fully retracted and fully extended. This configuration is useful where the truck does not have the height to use the rotating panels described in FIGS. 1-6. The advantages are if the truck is parked in a low-ceilinged garage, near a streetlight, or under a tree for example. This "birds wing" or "origami" embodiment gives the user different options. The extension or fold out pattern may be advantageous in certain situations. The four panels operate independently but can be programmed in infinite combinations. Meaning if the truck is parked next to a wall on the right side, only the left panels may retract. This can be done manually, remotely, by sensors on the truck or panels, programmed to extend and retract, based on light sensors as previously described, timers, or any other means of communication, wired or wireless. The panels open and close on sturdy rails/hinges, or by any other means. These panels fully retract and FIG. 7B shows the flap and opening, which comes opens up and then goes flush to the cab. The flap serves two purposes, (i) to keep the mechanisms clean and (ii) to aid in aerodynamics.

Figure 10:
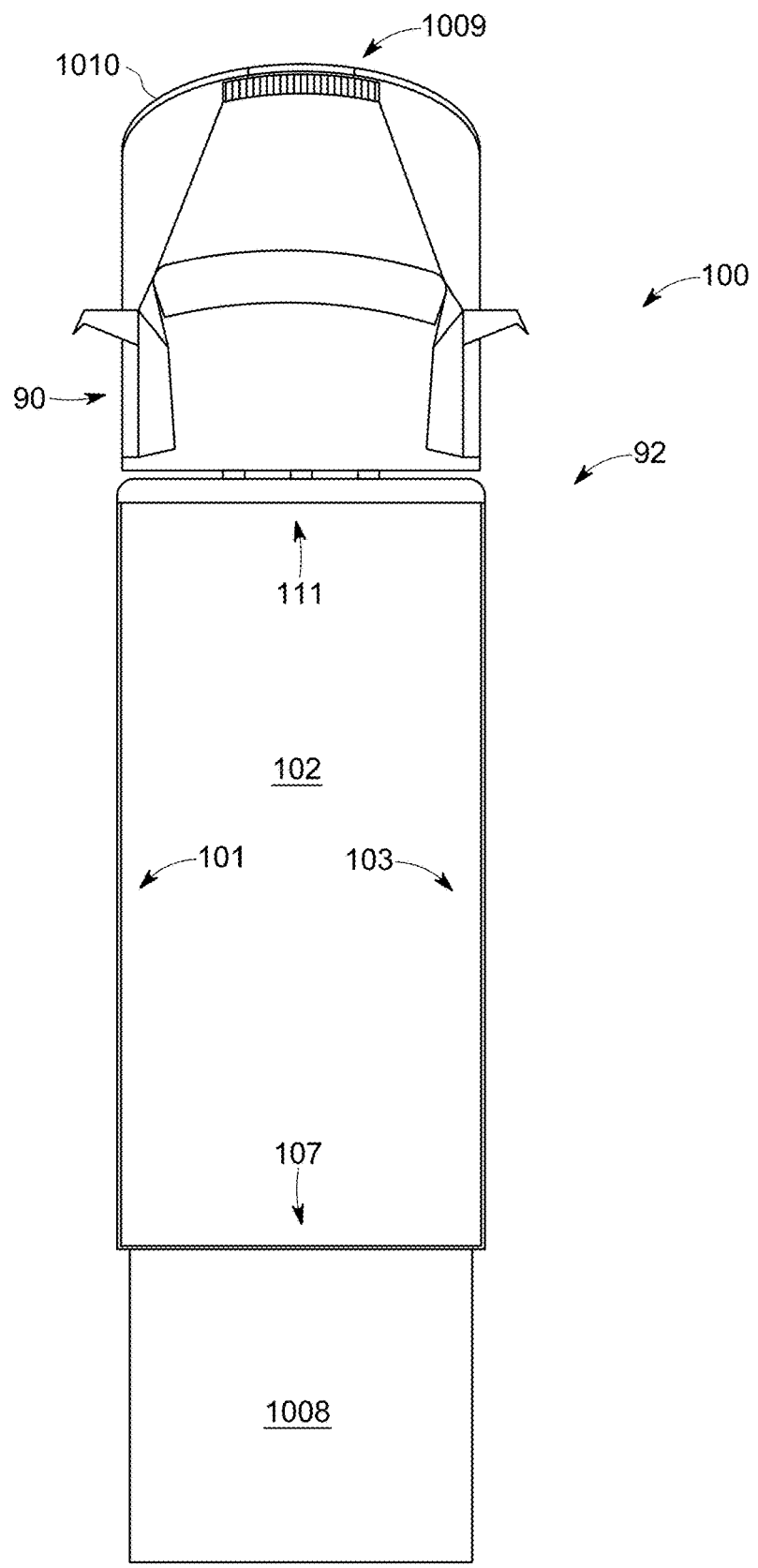
FIG. 10 is a top view of a truck showing another embodiment of mounting of rear and front panels.

FIG. 10 shows an alternative embodiment of the mounting and operation of front and rear panels. In FIG. 10, rear panel 1008 and front panel 1009 extend and retract on tracks mounted on the roof of the cab near the rear and front of the truck 100, respectively. They can operate independently, together or be programmed to extend out to any position desired by the end user. Front panel 1009 extends over the cab area. This panel may be the most useful in situations where the truck 100 has obstacles at the sides and rear. Panel 1009 can be programmed to extend in a fully extended position only to the front bumper shown at 1010 of the truck 100. If the front panel 1009 is only extended to the front bumper, the truck has no increased footprint. The advantage of extending the solar panel 1009 to the end of the bumper 1010 means that it can be extended to that position at all times, when the truck is not in use. It can be extended to the bumper 1010 by timer, end user programming, solar sensor, or simply locking or unlocking the vehicle. The solar panels 1008, 1009 extend in and out on tracks. The embodiment of FIG. 10 may be deployed as shown or may be combined in various ways with the other configurations of side panels described herein.

Figure 11C:
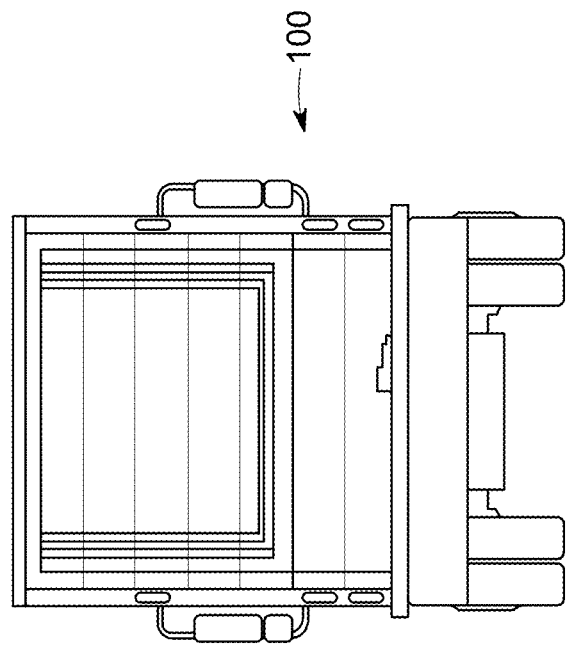
Figure 11B:
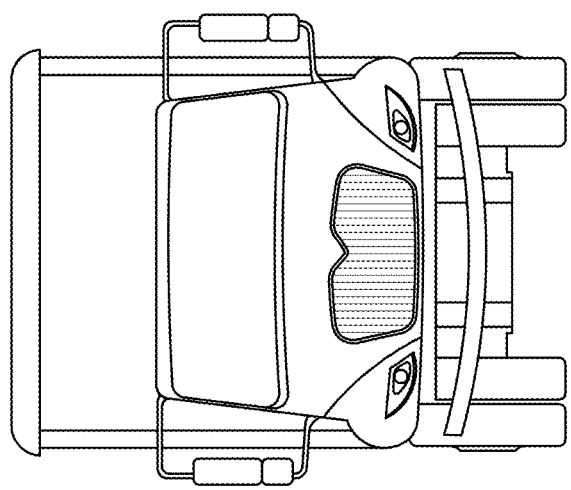

FIGS. 11A, 11B and 11C show left-side, front and rear views, respectively of an embodiment of truck 100 with all installed solar panels retracted.

Figure 12:
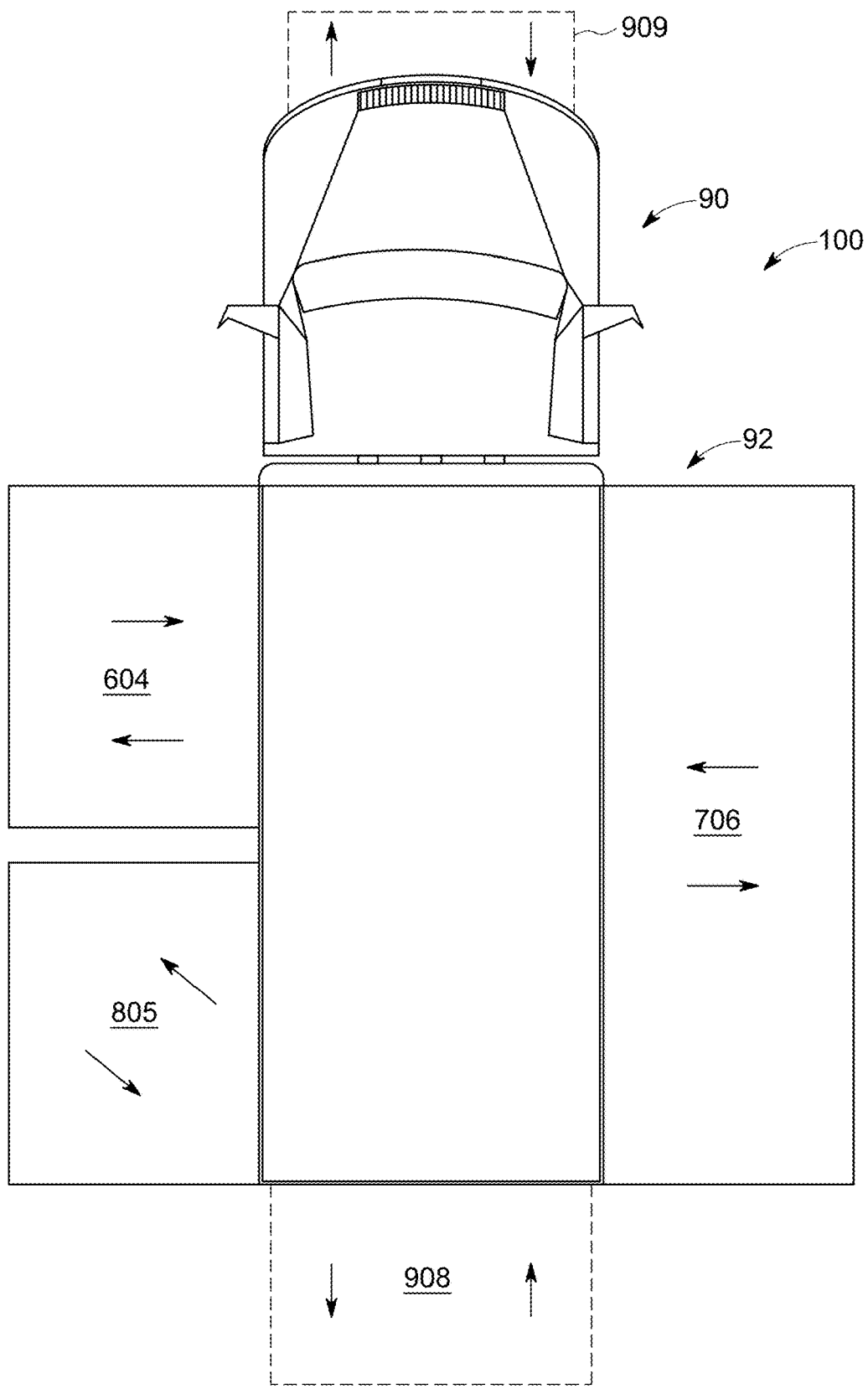
FIG. 12 shows an embodiment of a truck with panels mounted in accordance with a combination of the mounting mechanisms described herein.

FIG. 12 shows an embodiment of truck 100 with panels mounted in accordance with a combination of the mounting mechanisms described herein with first left-side panel 604 being slidably mounted, second left-side panel 805 being wing-style mounted and right-side panel 706, rear panel 908 and front panel 909 being slidably mounted.

Figure 13:
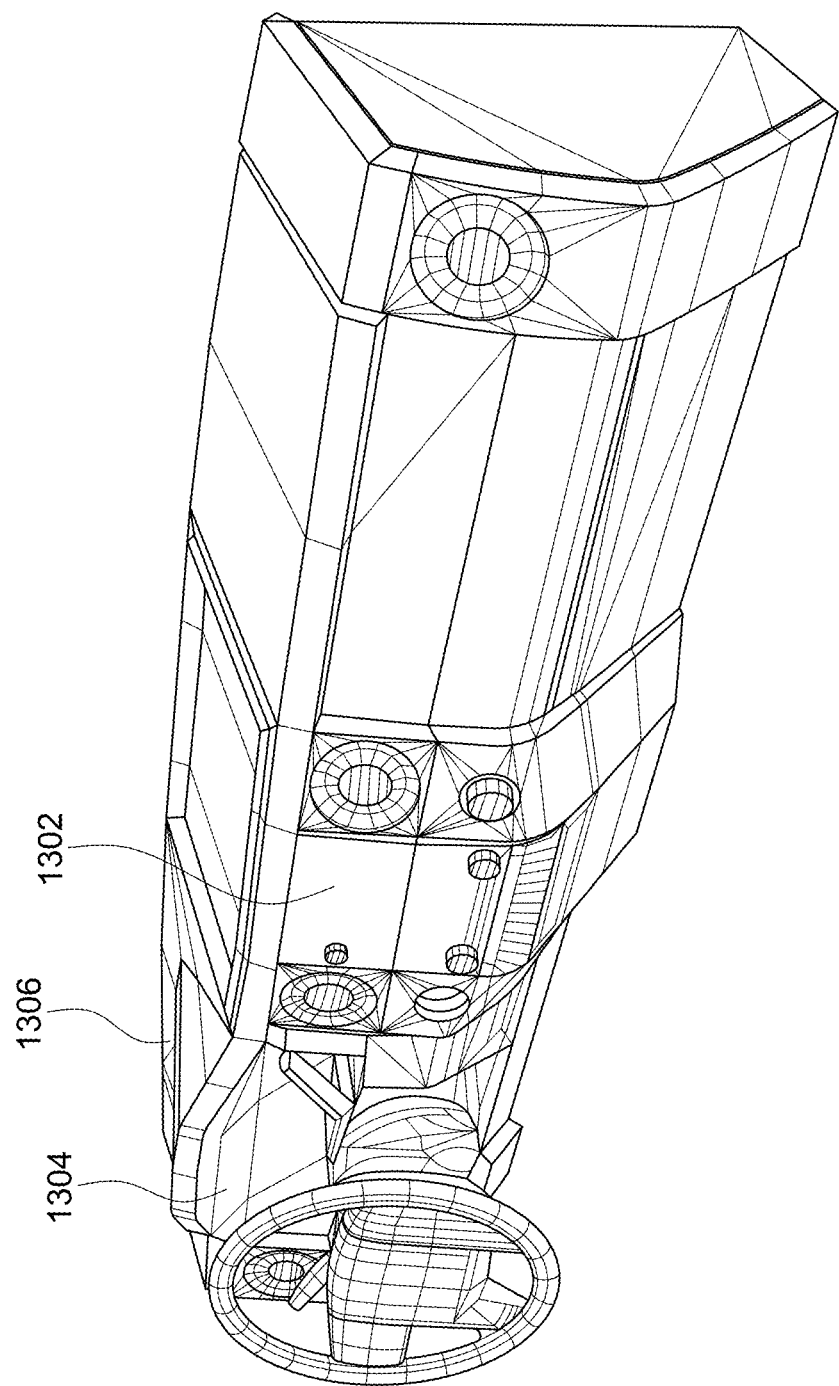
FIG. 13 shows an embodiment of an instrument panel in dash display.

FIG. 13 shows an embodiment of an instrument panel in dash display, which may be built into the truck 100, or removable as a tablet type display. Center dash display 1302 provides all information pertaining to the installed panels and their functions. The tablet or built-in center display 1304 may be inclusive or exclusive of the traditional in front of driver display. "Head's Up" display controller 1306 operates to display all information available to the driver in addition to, or exclusive to, for example if the vehicle operator prefers that function, for nighttime driving for example.

Figure 14:
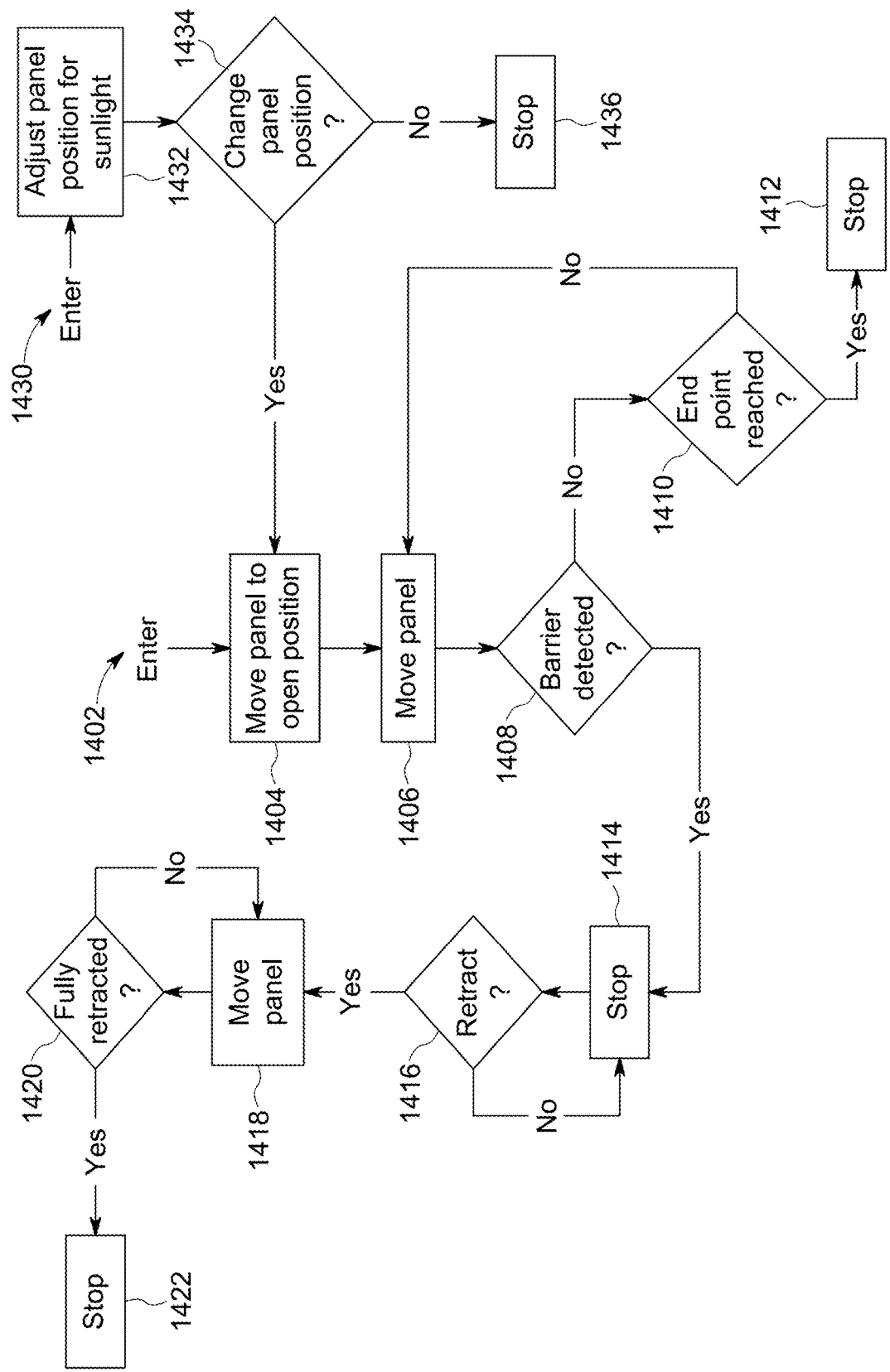
FIG. 14 is a flowchart illustrating an embodiment of operations pertaining to movement of panels mounted to a truck.
Figure 15:
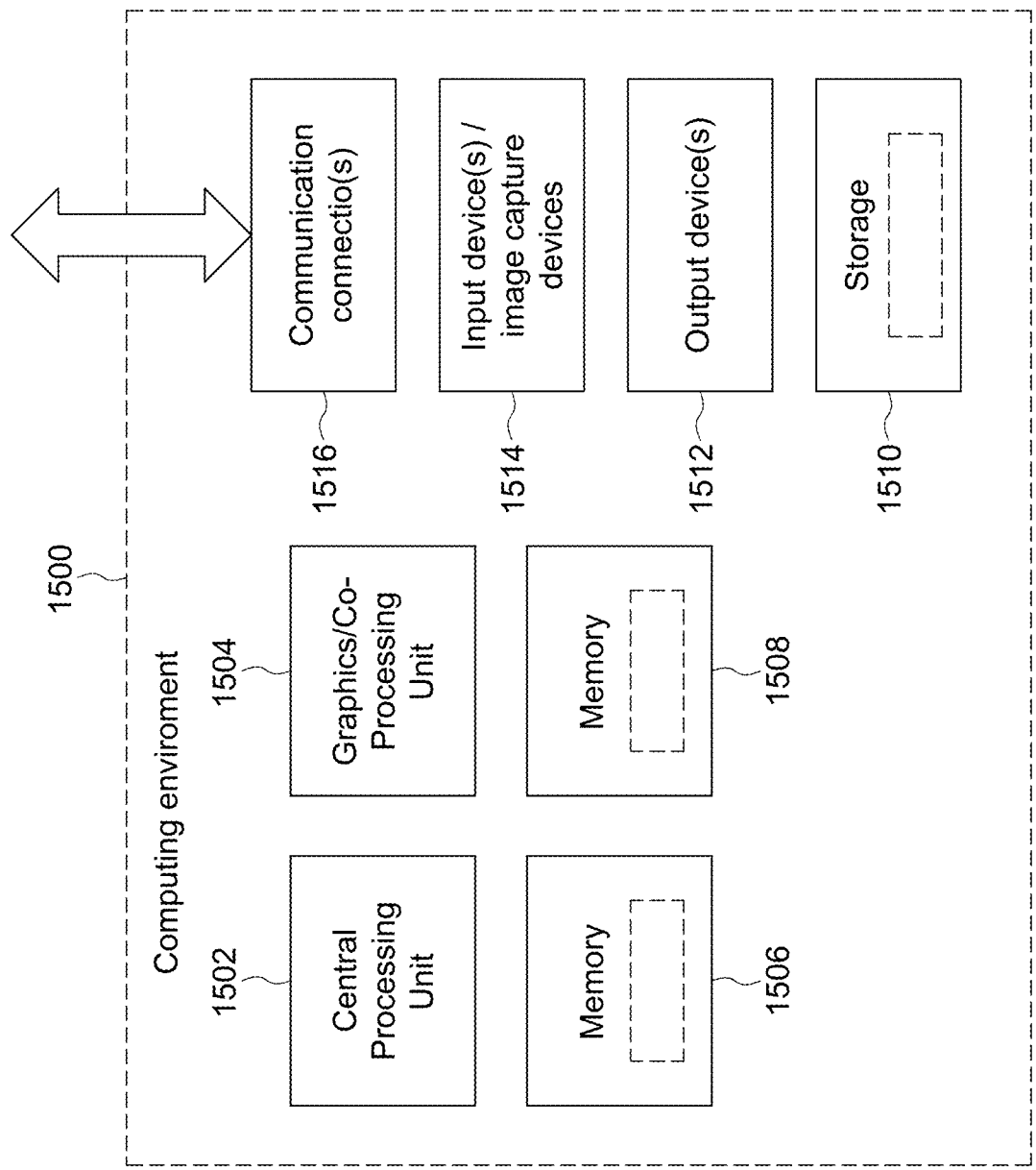
FIG. 15 illustrates a block diagram of hardware that may be employed in an implementation of the embodiments disclosed herein employing computer-executable instructions.

Certain of the above operations pertaining to movement of the panels may be seen in the flowchart of FIG. 14 which shows computerized operations that may be performed by a programmed computer (also referred to herein as a "controller") the hardware of which is shown in FIG. 15. The computerized operations may be entered at 1402 to initiate a routine to move a solar panel described herein to an open position. A command is received at 1404 to move a panel to an open position. At 1406 a signal is provided to one or more motors to move the panel to an open position. As the panel is being moved one or more sensors is being monitored at 1408 to determine if a barrier to movement of the panel in question has been detected. If not, then movement continues and at 1410 the panel position is monitored to determine if a desired endpoint has been reached. Once the endpoint has been reached the movement stops at 1412. If at 1408, a barrier to movement of the panel(s) in question has been detected the movement is stopped at 1414. At 1416 a test is performed to determine if the panel should be retracted. This may be performed by providing a message or signal to an operator as to whether the panel should be retracted. In one embodiment the retraction decision may be made automatically. If a decision to retract is made at 1416 then at 1418 the panel movement to a retracted position is initiated. At 1420 the panel position is checked to determine if it is fully retracted. If so, then at 1422 the movement is stopped. Otherwise, the movement continues. In one embodiment, a barrier detection operation such as at 1408 may be performed to detect if a barrier to movement has been detected. The barrier detection at 1408 operates to stop movement of the panel before physical contact with the barrier, which may damage the panel. In certain embodiments the motor may be equipped with a clutch type mechanism to decouple the motor from the panel mechanism in the event that a physical obstruction is detected.

Another routine is initiated at 1430 to adjust the position of a moveable panel to account for changes in sunlight. A rotatable panel may be rotated as the position of the sun changes during the day to optimize the panel position. A panel that slides may be slid to another position if sunlight is blocked by another object such as a building, vehicle or tree. At 1434, a test is performed if the panel position should be changed. This determination may be made by way of an optical detector on or near the panel in question that provides an indication of the solar energy impacting the panel. Other sensors may be employed to identify other positions where greater solar energy is being received. In some embodiments, particularly in the case of a rotatable panel, a table or other stored data may be employed to identify the optimal panel position. As seen the operations in connection with routine 1402 may be employed in moving the panel in question to take advantage of the barrier detection features of routine 1402. If no change in panel position is required then routine 1430 is exited at 1436. Using a solar sensor 112 positioned for example on the roof of the cab 90 of the vehicle, the controller can determine and follow the sun's position or light available positions.

The controller can be switched on and off, programmed for automatic use or accessed remotely by WIFI, Bluetooth, IoT, 5G or any other means of wired or wireless communication. The controller may be located in any area of the truck (shown under the hood for an example). The controller may also be remotely located and gather information externally and send back instructions. This could eliminate electronics aboard the vehicle, and potentially reduce costs for the operator. The position and status of the panels is shown on a main screen in the truck's cabin such as shown in FIG. 13. The information may also be on a tablet or dash display that is integrated into the dash of the cabin, but for example may be removable, for remote use.

As noted above, the various solar panels described herein may be extended/retracted in a variety of combinations such as extending/retracting individually, in various combinations and may be operated manually or in a pre-programmed manner. If the truck 100 is parked with no truck or obstacles behind the truck the rear panel may extend. If the truck 100 is surrounded on all sides by obstacles or other trucks, then only the roof 102 panel may be the only one in use. In various embodiments, the extension/retraction may be programmable, based on user needs. The programmable events can be based on user input, or via a remote response, which would determine the programs by the solar position, linked to daylight savings time, the month, and alike.

Aspects of certain of the embodiments herein can be implemented employing computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The program modules may be obtained from another computer system, such as via the Internet, by downloading the program modules from the other computer system for execution on one or more different computer systems. The functionality of the program modules may be combined or split between program modules as desired in various embodiments. Computer-executable instructions for program modules may be executed within a local or distributed computing system. The computer-executable instructions, which may include data, instructions, and configuration parameters, may be provided via an article of manufacture including a computer readable medium, which provides content that represents instructions that can be executed. A computer readable medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

FIG. 15 illustrates a block diagram of hardware that may be employed in an implementation of the embodiments disclosed herein employing computer-executable instructions. FIG. 15 depicts a generalized example of a suitable general-purpose computing system 1500 in which the described innovations may be implemented in order to improve the processing speed and efficiency with which the computing system 1500 operates to perform the functions disclosed herein. With reference to FIG. 15 the computing system 1500 includes one or more processing units 1502, 1504 and memory 1506, 1508. The processing units 1502, 1506 execute computer-executable instructions. A processing unit can be a general-purpose central processing unit (CPU), processor in an application-specific integrated circuit (ASIC) or any other type of processor. The tangible memory 1506, 1508 may be volatile memory (e.g., registers, cache, RAM), non-volatile memory (e.g., ROM, EEPROM, flash memory, etc.), or some combination of the two, accessible by the processing unit(s). The hardware components in FIG. 15 may be standard hardware components, or alternatively, some embodiments may employ specialized hardware components to further increase the operating efficiency and speed with which the system 10 operates. The various components of computing system 1500 may be rearranged in various embodiments, and some embodiments may not require nor include all of the above components, while other embodiments may include additional components, such as specialized processors and additional memory.

Computing system 1500 may have additional features such as for example, storage 1510, one or more input devices 1514, one or more output devices 1512, and one or more communication connections 1516. An interconnection mechanism (not shown) such as a bus, controller, or network interconnects the components of the computing system 1500. Typically, operating system software (not shown) provides an operating system for other software executing in the computing system 1500, and coordinates activities of the components of the computing system 1500.

The tangible storage 1510 may be removable or non-removable, and includes magnetic disks, magnetic tapes or cassettes, CD-ROMs, DVDs, or any other medium which can be used to store information in a non-transitory way, and which can be accessed within the computing system 1500. The storage 1510 stores instructions for the software implementing one or more innovations described herein.

The input device(s) 1514 may be a touch input device such as a keyboard, mouse, pen, or trackball, a voice input device, a scanning device, or another device that provides input to the computing system 1500. For video encoding, the input device(s) 1514 may be a camera, video card, TV tuner card, or similar device that accepts video input in analog or digital form, or a CD-ROM or CD-RW that reads video samples into the computing system 1500. The output device(s) 1512 may be a display, printer, speaker, CD-writer, or another device that provides output from the computing system 1500.

The communication connection(s) 1516 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The terms "system" and "computing device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

While the invention has been described in connection with the disclosed embodiments, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A truck comprising:
a container with an upper portion, the upper portion having a plurality of photovoltaic panels mounted upon an exterior surface of the upper portion;
one or more of the photovoltaic panels mounted to permit movement from a closed position to one or more open positions;
at least one battery electrically coupled to the one or more photovoltaic panels to store electrical energy generated by the one or more photovoltaic panels;
one or more sensors positioned on or near the vicinity of at least one of the photovoltaic panels to detect the presence of a physical object in the vicinity of the associated photovoltaic panel; and
a computerized controller that receives signals generated by the one or more sensors and which generates control signals to control movement of the one or more photovoltaic panels wherein the computerized controller is programmed with instructions that cause the computerized controller to respond to a command to cause a third one of the photovoltaic panels to move to an open position by,
providing to one or more motors coupled to the selected one of the photovoltaic panels an open signal to cause the third one of the photovoltaic panels to move to the open position;
monitoring signals received by one or more sensors associated with the third one of the photovoltaic panels to detect a barrier to movement of the third one of the photovoltaic panels;
causing stoppage of movement of the third one of the photovoltaic panels if a barrier to movement is detected; and
if a barrier to movement is not detected then permitting movement of the third one of the photovoltaic panels to the open position;
the computerized controller being further programmed with instructions that cause the computerized controller to decouple the one or more motors from the third one of the photovoltaic panels.

2. The truck of claim 1 wherein at least one of the one or more of the photovoltaic panels is mounted to permit movement from a closed position to one or more open positions is mounted at an edge by way of one or more hinges to permit at least some rotation about the edge from a closed position to one or more open positions.

3. The truck of claim 1 wherein at least one of the one or more of the photovoltaic panels is mounted to permit movement from a closed position to one or more open positions is mounted on a track to permit linear movement of the at least one of the one or more of the photovoltaic panels from a closed position to one or more open positions.

4. The truck of claim 1 further comprising:
one or more optical sensors positioned on or near the vicinity of a second of the photovoltaic panels to detect an amount of sunlight;
wherein the computerized controller receives signals generated by the one or more optical sensors and generates control signals to control movement of the second of the photovoltaic panels in response to signals generated by the one or more optical sensors.

5. The truck of claim 1 further comprising a cab portion and further comprising one or more photovoltaic panels positioned on an upper surface of the cab portion.

6. The truck of claim 1 wherein the barrier to movement is detected prior to contact by the third one of the photovoltaic panels with an object detected to cause the barrier to movement.

7. The truck of claim 1 wherein the computerized controller is programmed with instructions that cause the computerized controller to respond to a command to cause a fourth one of the photovoltaic panels to move to a closed position by:
providing to one or more motors coupled to the selected one of the photovoltaic panels a close signal to cause the fourth one of the photovoltaic panels to move to the closed position;
monitoring signals received by one or more sensors associated with the fourth one of the photovoltaic panels to detect a barrier to movement of the fourth one of the photovoltaic panels;
causing stoppage of movement of the selected one of the photovoltaic panels if a barrier to movement is detected;
if a barrier to movement is not detected then permitting movement of the fourth one of the photovoltaic panels to the closed position.

8. The truck of claim 7 wherein the command to cause the fourth one of the photovoltaic panels to move to a closed position is generated automatically by the computerized controller.

9. The truck of claim 8 wherein the command to cause the fourth one of the photovoltaic panels to move to a closed position is generated upon input by an operator of the truck.

10. The truck of claim 9 wherein the fourth one of the photovoltaic panels comprises all photovoltaic panels on the truck that are moveable mounted.

11. The truck of claim 10 wherein the computerized controller is further programmed with instructions that cause the computerized controller to provide a signal to the operator of the truck to move the fourth one of the photovoltaic panels to move to the open position.

12. The truck of claim 1 wherein the computerized controller is programmed with instructions that cause the computerized controller to:
process a signal received from an optical detector positioned to detect solar energy impacting a first of the photovoltaic panels to determine an amount of solar energy impacting the first of the photovoltaic panels; and provide to one or more motors coupled to the first of the photovoltaic panels a signal to cause the first of the photovoltaic panels to move to a position that increases the amount of solar energy that impacts the first of the photovoltaic panels.

13. The truck of claim 1 wherein at least a first of the photovoltaic panels that is mounted on the exterior surface of the upper portion is mounted to extend and retract like a bird's wing.

14. The truck of claim 1 wherein one or more of the sensors is powered by a battery contained in a housing of the sensor.

15. A chassis cab truck comprising:
a container having an enclosed cuboid-shaped cargo area, the container with having an upper portion, the upper portion having a plurality of photovoltaic panels mounted upon an exterior surface of the upper portion;
one or more of the photovoltaic panels mounted to permit movement from a closed position to one or more open positions, the photovoltaic panels comprising,
    a first set of panels, comprising a first cab panel positioned above the upper portion of the container in the closed position and above a cab of the truck in the open position, and
    a second set of panels comprising a first side panel and a second side panel, the second set of panels positioned above the upper portion of the container in the closed position and extending from the upper portion of the container outward from a respective side of the upper portion of the container in the open position; and
at least one battery electrically coupled to the one or more photovoltaic panels to store electrical energy generated by the one or more photovoltaic panels;
one or more sensors positioned on or near the vicinity of at least one of the photovoltaic panels to detect the presence of a physical object in the vicinity of the associated photovoltaic panel; and
means, responsive to the one or more sensors, for generating control signals to control movement of the one or more photovoltaic panels.

16. The truck of claim 15 wherein the means for generating control signals to control movement of the one or more photovoltaic panels comprises:
a computerized controller that causes movement of the one or more photovoltaic panels in response to a detected physical object in a path of movement of a first of the one or more photovoltaic panels.

17. The truck of claim 16 wherein the computerized controller is programmed with instructions that cause the computerized controller to respond to a command to cause a first one of the photovoltaic panels to move to a closed position by:
providing to one or more motors coupled to the selected one of the photovoltaic panels a close signal to cause the first one of the photovoltaic panels to move to the closed position;
monitoring signals received by one or more sensors associated with the first one of the photovoltaic panels to detect a barrier to movement of the first one of the photovoltaic panels;
causing stoppage of movement of the selected one of the photovoltaic panels if a barrier to movement is detected;
if a barrier to movement is not detected then permitting movement of the first one of the photovoltaic panels to the closed position.

18. The truck of claim 15 wherein the photovoltaic panels further comprise:
a third set of panels, comprising a first rear panel, positioned above the upper portion of the container in the closed position and extending from the rear of the container in the open position.

19. The truck of claim 15 wherein the photovoltaic panels further comprise:
a third set of panels, comprising a first rear panel, positioned upon a rear portion of the container in the closed position and extending from the rear of the container in the open position.

20. The truck of claim 15 further comprising:
a fourth set of panels fixedly mounted to the upper portion of the container;
wherein the first set and second set of panels are each positioned in the closed position to be below the fourth set of panels.

\* \* \* \* \*